(12) United States Patent
Krautkrämer

(10) Patent No.: US 11,377,271 B2
(45) Date of Patent: Jul. 5, 2022

(54) PLASTIC CLOSURE PART WITH SEVERABLE MEMBRANE

(71) Applicant: BERICAP Holding GmbH, Budenheim (DE)

(72) Inventor: Günter Krautkrämer, Budenheim (DE)

(73) Assignee: BERICAP Holding GmbH, Budenheim (DE)

( * ) Notice: Subject to any disclaimer, the term of this patent is extended or adjusted under 35 U.S.C. 154(b) by 146 days.

(21) Appl. No.: 16/764,542

(22) PCT Filed: Nov. 13, 2018

(86) PCT No.: PCT/EP2018/081095
§ 371 (c)(1),
(2) Date: May 15, 2020

(87) PCT Pub. No.: WO2019/096795
PCT Pub. Date: May 23, 2019

(65) Prior Publication Data
US 2020/0339312 A1    Oct. 29, 2020

(30) Foreign Application Priority Data
Nov. 16, 2017 (DE) .................. 10 2017 126 965.7

(51) Int. Cl.
*B65D 47/10* (2006.01)
*B29C 45/00* (2006.01)
(Continued)

(52) U.S. Cl.
CPC ........ *B65D 47/103* (2013.01); *B29C 45/0053* (2013.01); *B65D 41/3428* (2013.01);
(Continued)

(58) Field of Classification Search
CPC ...... B65D 47/103; B65D 47/10; B65D 47/06; B65D 41/50; B65D 41/3428; B29C 45/0053
(Continued)

(56) References Cited

U.S. PATENT DOCUMENTS 4,022,258 A   5/1977 Steidley
4,401,227 A * 8/1983 Pehr ................... B65D 41/3447
                                                                215/252
(Continued)

FOREIGN PATENT DOCUMENTS

CH            610854 A5    5/1979
CN           2412850 Y     1/2001
(Continued)

OTHER PUBLICATIONS

Translation of JP2000025816, Yoshikawa, Jan. 25, 2000, Fig. 2 (Year: 2000).*
(Continued)

*Primary Examiner* — Robert J Hicks
(74) *Attorney, Agent, or Firm* — Snell & Wilmer L.L.P.

(57) ABSTRACT

The invention concerns a plastic closure part (10) which can be fixed to a container or a further closure part to be fixed to the container, comprising a tubular discharge portion (3) whose cross-section is closed by a membrane (7) which has a tear line (8) extending peripherally over more than 180° along its outer edge and a corresponding method for the production of such a closure. In order to develop a closure part having the features set forth in the opening part of this specification and a method for the production thereof to the effect that the problems occurring upon injection moulding due to narrow flow passages are eliminated it is provided
(Continued)

according to the invention that the tear line (8) is formed by a cut introduced into the material of the membrane (7) with a cutting or punching tool.

20 Claims, 2 Drawing Sheets

(51) Int. Cl.
*B65D 41/34* (2006.01)
*B65D 41/46* (2006.01)
*B65D 41/50* (2006.01)
*B29L 31/56* (2006.01)

(52) U.S. Cl.
CPC .............. *B65D 41/46* (2013.01); *B65D 41/50* (2013.01); *B29C 2793/009* (2013.01); *B29C 2793/0018* (2013.01); *B29C 2793/0054* (2013.01); *B29L 2031/565* (2013.01); *B65D 2547/06* (2013.01)

(58) Field of Classification Search
USPC ............... 215/253, 250, 344, 343, 341, 316; 220/277, 266, 265; 222/89, 83, 81
See application file for complete search history.

(56) References Cited

U.S. PATENT DOCUMENTS

| | | | | |
|---|---|---|---|---|
| 4,682,702 | A * | 7/1987 | Gach | B65D 51/20 |
| | | | | 222/541.9 |
| 9,321,567 | B2 * | 4/2016 | Daggett | B65D 47/10 |
| 2006/0057257 | A1 * | 3/2006 | Ma | B65D 41/3447 |
| | | | | 426/115 |
| 2008/0029540 | A1 * | 2/2008 | Johnson | B67B 7/26 |
| | | | | 222/83 |
| 2009/0212079 | A1 * | 8/2009 | Baughman | B65D 47/123 |
| | | | | 222/529 |
| 2010/0140208 | A1 | 6/2010 | Parrinello et al. | |

FOREIGN PATENT DOCUMENTS

| | | |
|---|---|---|
| CN | 1590232 A | 3/2005 |
| CN | 2693684 Y | 4/2005 |
| CN | 101743173 A1 | 6/2010 |
| CN | 203047763 U | 7/2013 |
| CN | 203854982 U | 10/2014 |
| CN | 204750898 U | 11/2015 |
| CN | 205396952 U | 7/2016 |
| CN | 206606536 U | 11/2017 |
| JP | 2000025816 A | 1/2000 |
| WO | 0248020 A1 | 6/2002 |
| WO | 2007146486 A2 | 12/2007 |

OTHER PUBLICATIONS

International Preliminary Report on Patentability for PCT/EP2018/081095 dated May 19, 2020; 6pp.
Notification of Transmittal of Translation of the International Preliminary Report on Patentability for PCT/EP2018/081095 dated May 28, 2020; 1pp.
Chinese Office Action, for Application No. CN 201880065200.1, dated May 31, 2021 (original and English translation).
International Search Report for PCT/EP2018/081095 dated Mar. 8, 2019; 2pp.
German Search Report dated Apr. 12, 2018; 5pp.
German Written Opinion for PCT/EP2018/081095; 5pp.
Chinese Office Action for Application No. CN 201880065200.1, dated Feb. 11, 2022 (original and English translation).

* cited by examiner

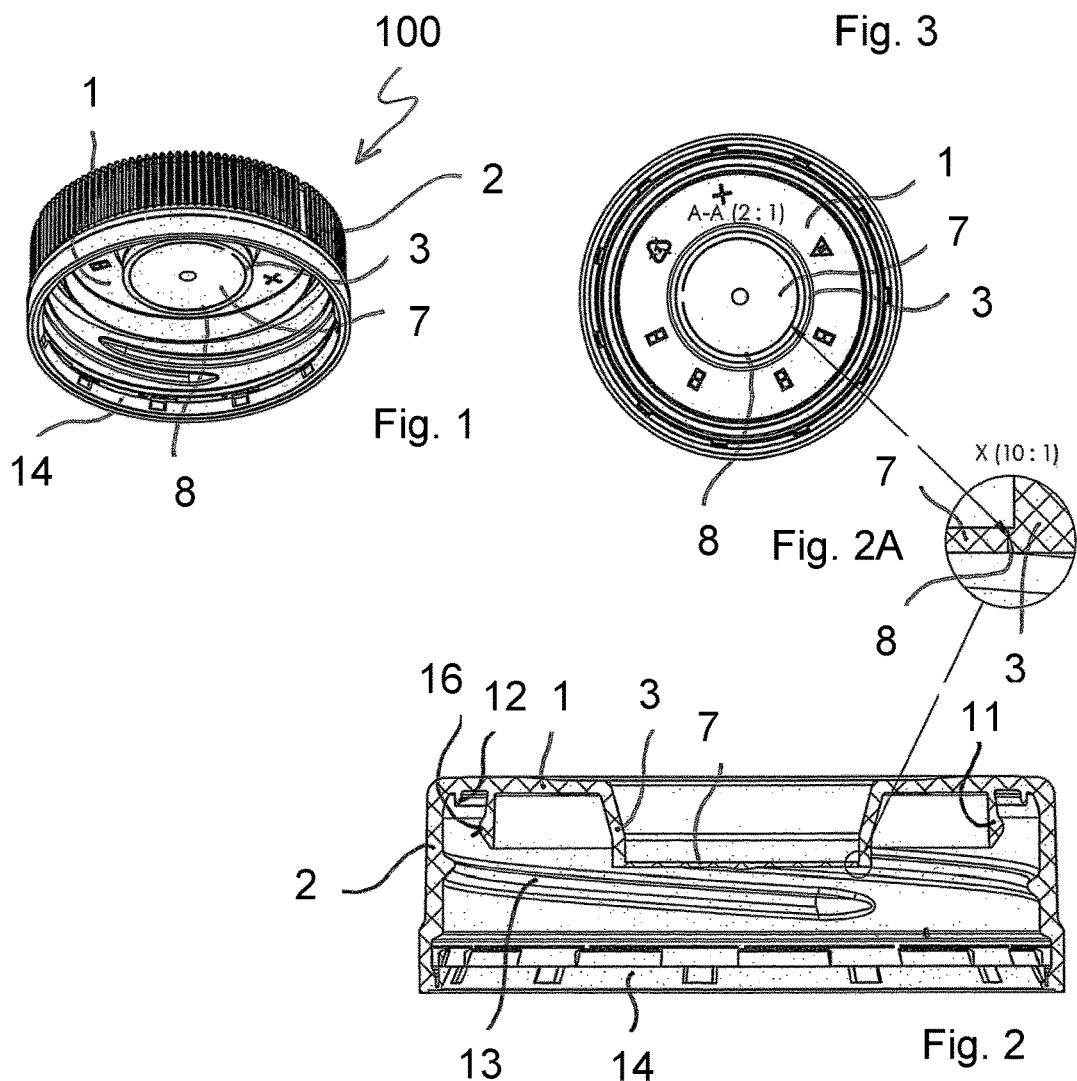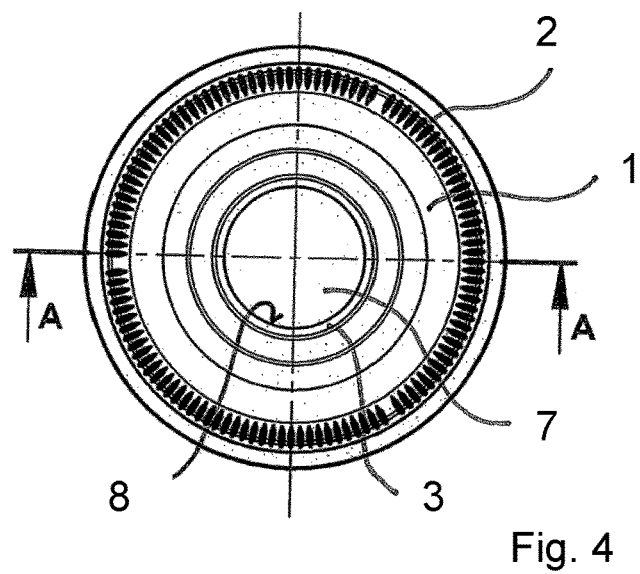

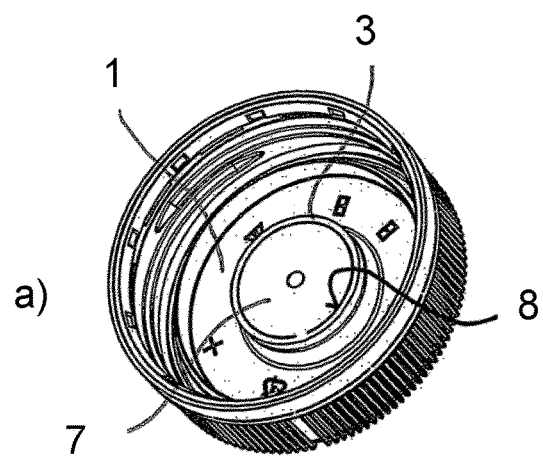
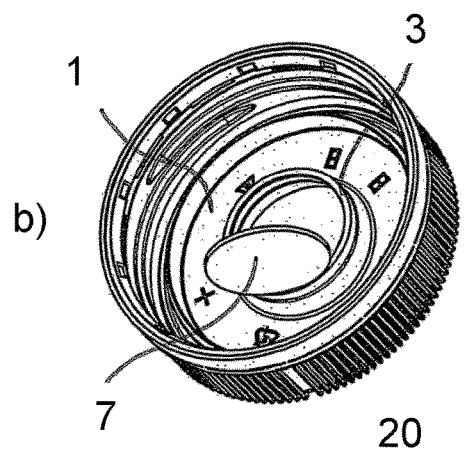
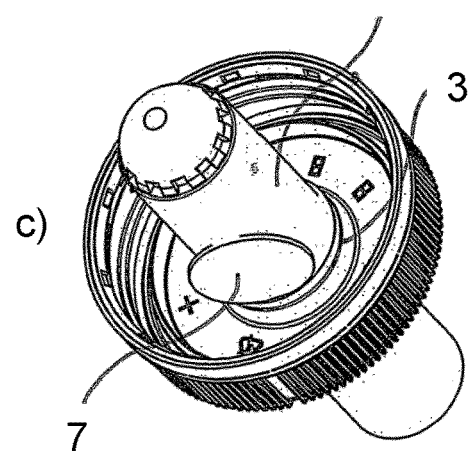
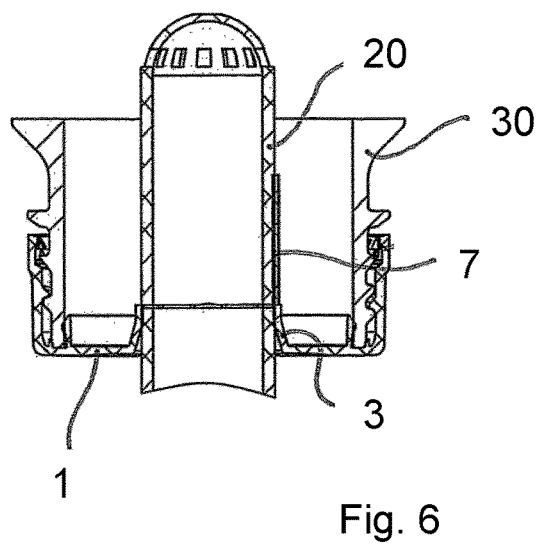
Fig. 5
Fig. 6

PLASTIC CLOSURE PART WITH SEVERABLE MEMBRANE

CROSS-REFERENCE TO RELATED APPLICATIONS

This application is a national stage entry of International Patent Application No. PCT/EP2018/081095, filed Nov. 13, 2018, entitled "PLASTIC CLOSURE PART WITH SEVERABLE MEMBRANE," which claims priority to German Patent Application Serial No. 102017126965.7, filed Nov. 16, 2017, entitled PLASTIC CLOSURE PART WITH REMOVABLE MEMBRANE, the disclosures of which are hereby incorporated by reference in their entirety.

FIELD

The present invention concerns a plastic closure part which can be fixed to a container or to a further closure part which is to be fixed to the container, comprising a tubular discharge portion whose cross-section is closed by a membrane which has a tear line extending along its outer edge over a peripheral angle of at least 180°.

BACKGROUND

Such closure parts are known in the state of the art of many different types. Such a closure part is fixed directly or indirectly to the edge of a container opening like for example to the neck of a bottle or canister, possibly together with further closure elements, in such a way that it cannot be detached from the container opening without visible damage or alteration of any parts of the closure. Even when a cover or a screw cap which surrounds the closure part with the discharge portion is removed from the closure the opening cross-section of the discharge portion which for example can be in the form of a pouring spout is still closed by the membrane which thus serves as a tamper-evident element for the unadulterated content of the container.

To open the opening cross-section the membrane is detached from the discharge portion along the tear line which can be of a completely or also only partially peripherally extending configuration and depending on the respective kind of disclosure the membrane can either be pushed through from the outside inwardly or can be pushed aside or it is pulled out of the discharge portion by way of a pull ring, a grip tab or other actuating element which is connected to the membrane.

SUMMARY

The closure part according to the invention, of which the element that is essential for the invention comprises the membrane which closes the opening cross-section can form a part of a closure, for the fixing of which on a container neck further parts are required, or which is also to be provided with an additional cap or the like, or it can also include the parts required for fixing, and in particular can also on its own form a complete closure.

The term "membrane" in this respect is not limited to a disc-like or film-like element but includes all elements which close an opening cross-section and which are admittedly integrally connected to the discharge portion but which can be entirely or partially separated from the discharge portion defining the cross-section, by an at least partially peripherally extending tear line. Accordingly the discharge portion can also assume many different shapes and can be formed for example from a short tube portion but also from a plate, of which an inner part forms the separable membrane, the area of which at the same time defines the maximum opening cross-section.

In this respect the terms used in the context of the present description "up", "down" or axially "upwards" or axially "downwards" relate to an orientation of the closure part, as occurs when the container is standing upright, the container opening is at the top and the closure which usually has either a screw thread or is in the form of a snap-on or snap-in closure is screwed or snapped on to the neck of the container or is inserted into an opening, but at any event is fixed in sealed relationship at the edge of a container opening.

For the purposes of illustration the closure part in the present description is predominantly described in its variant as a closure for a large container, but is not restricted thereto. Large containers in accordance with the present invention are typically of a volume of between 5 and 50 l, mostly between 10 and 25 l, and are frequently used for drinking water.

In the case of a closure for large containers, that includes a closure part and is shown as a possible embodiment in the Figures the membrane can be torn open along the tear line by for example the front end of a discharge spigot being introduced into the discharge portion and pressed axially against the membrane so that the material of the membrane tears along the tear line. As in this case the tear line is preferably not of a completely peripherally extending configuration the membrane remains joined to the discharge portion along an unweakened or less weakened portion of the peripheral line defined by the tear line, so that the membrane is only pushed aside inwardly and folded over and substantially clears the opening cross-section of the discharge portion.

In practical use a large container is usually placed upside down so that the closure (also referred to as the closure cap) is downward and a discharge spout or discharge tube is introduced into the discharge portion of the plastic closure which is then underneath, in which case the discharge tube comes into contact with the membrane which closes the cross-section of the discharge portion. By applying a sufficient force to the membrane it tears along the tear line and is pushed aside by the discharge spigot which then engages through the discharge portion and the inner end of which is then in communication with the container interior.

In that situation the discharge portion and the discharge spigot are so matched to each other that the discharge spigot bears sealingly against the inside wall of the discharge portion or the edge surrounding the membrane beyond the tear line.

The discharge spigot is substantially a tube which in use projects through the discharge portion and with its inner end into the container interior while an outer portion of the discharge spigot can be provided with a discharge valve. Such large containers usually contain drinking water which under the action of the force of gravity can be discharged from or tapped off the upside-down container by means of the discharge spigot.

The present invention however extends to all plastic closure parts having a discharge portion, the opening cross-section of which is closed by a membrane which is first to be opened for use thereof. Besides the above-mentioned large containers for drinking water closures having a sealed membrane are however also used inter alia for oil canisters and other containers for technical or chemical liquids like for example paints and the like.

The injection-moulded closure part which comprises plastic can be in the form of a separate insert or attachment for a container opening, a container neck or also in the form of a screw cap or a snap-on cap with a holding bead. The closure here is described in a position as it generally assumes when the closure has been fitted to and fixed on the container neck of the filled, upright container.

A head plate in the form of a circular ring which defines the closed side of the closure for example in the case of a closure for large containers is thus disposed upwardly and for example an annular hollow space in the closure, which accommodates the edge of the neck of a bottle, faces with its open side downwardly.

As a first security feature in the case of closures for large containers it is possible for a discharge portion generally to be still closed and covered by a closure seal which can comprise a thin plastic film and which prior to connection of the closure with a discharge spigot is either pulled off or pierced. As a further security feature such a plastic closure, when it is in the form of a screw closure, can usually also have a so-called tamper-evident band which is disposed at the lower edge of the cap skirt and tears away when the closure is taken off the container neck and removed.

Finally closure parts of the kind in question have the membrane which is also referred to as a "membrane seal" and which closes the opening cross-section of the discharge portion, for example as a pouring spout.

Those measures ensure that the end consumer receives the container content like for example drinking water or also other drinkable or technical liquids unadulterated in the form in which it was originally filled into the container.

The production of such plastic closures is generally effected using an injection moulding method in a mould which typically comprises a plurality of so-called cavities, each of the cavities forming the negative shape of the closure, into which in production of that closure part hot liquid plastic material, generally polypropylene or polyethylene, is injected under high pressure. As many closures, apart from minor details like for example the thread, are of a substantially cylinder-symmetrical shape it is desirable and usual for the sprue, that is to say the injection opening in the cavity which forms a negative shape of the closure to be disposed at centre of the closure. Other positions for the sprue easily result in irregular filling of the cavity so that with other arrangements of the sprue the duration of the injection moulding operation is prolonged and/or corresponding closures cannot be produced with the required quality and dimensional accuracy or however the closure would have to be produced overall with a greater wall thickness and a greater consumption of material.

In the case of a closure for large containers for which the present invention was inter alia developed and which typically is of a nominal diameter of 50 mm the geometrical centre of the closure cap is at the same time at the centre of the membrane which however in turn has a tear line which peripherally extends over at least 180°, usually almost 360°, and along which the membrane is to tear open upon later being put to use so that it can be laterally pushed away out of the cross-section of the discharge portion or the discharge spigot by way of the non-weakened portion which still remains and which acts as a kind of hinge.

In the cavity for a closure part with a membrane which can be torn out or which can be folded out of the opening cross-section of the discharge portion the tear line necessarily forms a constriction between the die and the punch of the mould, through which the liquid plastic which is fed by way of the sprue at the centre of the membrane has to be pressed in order to fill up the other parts of the mould which include the discharge portion, the head plate and the peripherally extending cap skirt, possibly including the tamper-evident band, as well as also other sealing elements.

That requires on the one hand a plastic material capable of good flow and it thus limits the available plastic while on the other hand it also requires very high pressures with which the liquid plastic has to be injected into the mould in order to reach the cavities which are furthest away from the sprue. This also means that the possible options in terms of manufacture of those closures, in dimensionally accurate form, within close tolerances, are restricted.

A further problem which has been encountered in practical use of those closures lies in the force required to tear the membrane open along the tear line and urge it aside.

That applies both to large containers when a discharge spigot has to be introduced into the discharge portion of the closure of a container and also when the membrane has to be pulled out of the discharge portion by way of a pull ring which is connected thereto, and into which typically only one finger of a hand can engage. On the other hand however because of the above-indicated problems in the injection moulding process it is scarcely possible for the tear line, along which the wall thickness of the plastic material is typically at least 0.15 mm, to be still further constricted.

The invention moreover also concerns a method of producing a plastic closure part having a discharge portion and a membrane closing the cross-section of the discharge portion as set forth in one of claims 1 to 11, which includes injection moulding of the plastic closure part in an injection moulding mould.

In comparison with that state of the art the object of the present invention is to develop a closure part having the features set forth in the opening part of this specification and a method for the production thereof, in such a way that at least one of the above-listed problems is overcome.

According to an aspect of the present invention that object is attained by a closure part having the features of claim 1, which is characterised in particular in that the tear line comprises a cut which after conclusion of the injection moulding operation is introduced with a cutting or punching tool into the material of the membrane or it comprises the thin wall portion of the membrane, that remains under the cut.

The expression "after conclusion of the injection moulding operation" means in practice after ejection of the closure part from the injection moulding mould, in which respect however it would also be conceivable for the cutting or punching operation to be still carried out within the injection moulding mould, even if the plastic is not yet completely hardened.

The surface of the tear line introduced by cutting or punching differs from corresponding surfaces which were produced by constrictions in a mould so that subsequent production of the tear line is visible on the finished closure part by virtue of the surface structure and generally also in consideration of the cross-sectional shape of the tear line.

The plastic closure part can thus be firstly produced in the injection moulding mould without any tear line, that is to say the membrane is of a relatively large and desirably uniform wall thickness throughout including its join to the discharge portion. The liquid plastic injected in the centre of the membrane can therefore very easily flow through that cavity without constrictions and can be distributed over the entire volume of the injection moulding mould or the respective cavity. A cut is then introduced only into the closure part when injection thereof is finished in that way, in the proximity of the outer edge of the membrane, that is to say at or in the proximity of the join thereof to the discharge portion, which cut involves the material of the membrane to a precisely defined depth, and severs that material to a very small remaining wall thickness. The remaining wall thickness in the region of that separation line, that is to say the thickness of the wall of the membrane, that remains in the region of the cut, can in that case be very accurately set, and in particular can be less than 0.15 mm and it can preferably be reduced to a maximum of 0.1 mm thickness. In an embodiment the wall thickness of the membrane, that remains under the cut, is between 0.06 and 0.1 mm, in particular 0.08 mm.

The cut depth can however also be variably set with a punching tool along the periphery of the membrane in order for example to give a greater material thickness along a short portion in the peripheral direction so that the portion in question can serve as a hinge, or in order to make a starting portion of the tear line, in the proximity of which for example a pull ring is fitted, particularly thin as the membrane can be relatively easily detached along the remaining tear line when a starting portion is already torn open.

Designing the tear line in the form of an incision subsequently introduced into the membrane has a number of advantages. On the one hand, as already mentioned, in production of the closure in the injection moulding mould, the plastic can flow unimpededly in the region of the tear line as the membrane wall thickness there is still initially sufficiently large. As a result the pressures used in the injection operation can be reduced and there is also a greater degree of freedom in the choice of the plastic material used. The mould structure is also simplified because considerably less complication and cost is required than in the case in which a precisely defined, very narrow flow gap has to be set for the tear line between the die and the punch.

In addition the force required for tearing open the tear line can also be markedly reduced by the depth of the cut or by the remaining smaller wall thickness and can be adjusted to a precisely desired value. The lower pressures, the simplification in mould production and also the greater freedom in the choice of suitable plastic materials in turn lead to better observing dimensional tolerances and permit production of the closures with integrated sealing elements, for which no separate seal is then required.

According to a preferred embodiment of the invention it is provided that the tear line of the membrane is cut in a region in which the wall thickness of the membrane (elsewhere), that is to say outside the region which is thinned by the incision itself, is at least 0.5 mm. In addition, in an embodiment, the membrane in the region of the cut tear line, is reduced to a thickness of less than 0.15 mm, preferably to a maximum of 0.1 mm in thickness.

The length of the tear line along the periphery can also be very exactly set in that way, wherein in an embodiment it is provided that the tear line extends over more than 270° and less than 360°, in particular however over at most 355° and preferably more than 330°.

In a reduction of the remaining, unweakened portion of the membrane, which upon engagement with the discharge spigot effectively acts as a kind of hinge, the membrane no longer opposes any noticeable resistance to being torn open if the hinge region is restricted to less than 30° along the periphery. On the other hand a hinge portion of 10° peripheral length still securely fixes the membrane to the discharge portion so that there is no risk of the membrane completely tearing away from the discharge portion and then being disposed loosely within the container.

The radial spacing of the tear line from the inside wall of the discharge portion in the region thereof which directly adjoins the membrane is in accordance with an embodiment between 0.1 and 1 mm or precisely corresponds to the inside radius of the discharge portion, and is therefore adapted as far as possible to the cross-section of the discharge portion in its region adjoining the membrane. The membrane is desirably arranged at the lower end (that is to say the end which faces towards the container interior) of the discharge portion.

It has further proven to be desirable if the incision forming the tear line is introduced from the inside of the closure part. The membrane is generally more easily accessible from the inside of the closure part (which is towards the container interior), in particular when it is disposed at the lower end of the discharge portion, so that a suitable tool can also be easily applied from here, to produce the incision forming the tear line. In an embodiment of the invention the discharge portion extends at least portion-wise from the head plate towards the lower end in a conically tapering configuration. The conical taper facilitates introduction of a discharge spigot. Desirably however the lower portion of the discharge portion, that adjoins a membrane, is of a cylindrical configuration, which facilitates sealing application of the outside surface of a discharge spigot against the inside wall of the discharge portion.

In addition in an embodiment of the invention the closure part has a sealing projection portion which extends axially downwardly between the discharge portion and the cap skirt, for engagement with the inside wall of a container neck.

The sealing projection portion together with an outer portion of the head plate and the cap skirt then forms an annularly peripherally extending, U-shaped cavity which is also referred to as the "closure foot" and in which the upper edge of a bottle neck can be received in sealing relationship when the sealing projection portion engages sealingly into the interior of the container neck. In addition annularly peripherally extending sealing elements can also be provided at the bottom of that U-shaped cavity, which elements come into engagement with the end or the upper edge of the container neck. The bottom of the U-shaped cavity in that case is formed by the portion of the head plate, that is between the cap skirt and the sealing projection portion.

The sealing configuration can be formed for example by a cylindrical sealing projection portion which projects downwardly between the cap skirt and the discharge portion from the head plate and which has a radially outwardly forwardly curving sealing bead which can come into sealing engagement with the inside surface of a container neck.

In addition in an embodiment of the present invention in which the closure has a female thread for screwing on to a container neck provided with a thread, the lower edge of the cap skirt has a tamper-evident band which is connected to the cap edge by easily frangible bridges.

The in part delicate structure of such a tamper-evident band like the sealing elements in question and the dimensional accuracy thereof can be more easily implemented than in the case of conventional closures, by virtue of the measures according to the invention, that is to say by the provision of flow passages in the membrane region of larger cross-section and possibly also by the use of suitable plastic materials.

In regard to the method the object of the invention is attained in that after the injection moulding operation and at least partial hardening of the plastic closure part an at least partially peripherally extending incision is produced in the membrane.

In a variant of the method the tear line is only produced after the injection moulding operation by a cut by means of a cutting or punching tool.

More desirably the incision can be formed while the plastic closure part is still in the closed or partially opened injection moulding mould prior to definitive ejection.

The method has been found to be particularly advantageous in particular when the sprue for filling the cavities of the injection moulding mould is provided in the region of the membrane, preferably in the centre thereof, because then the full material cross-section of the membrane is available for the through flow of the liquid plastic into all regions of the cavity, that are connected thereto, and there are scarcely still any further constrictions.

Further advantages, features and possible uses of the present invention will be apparent from the description hereinafter of a preferred embodiment and the related Figures.

BRIEF DESCRIPTION OF THE FIGURES

FIG. 1 shows a perspective view from below of a plastic closure according to the invention, FIG. 2 shows a cross-section, containing the closure axis, of a closure as shown in FIG. 1, FIG. 2A shows an enlarged view of a portion from FIG. 2, FIG. 3 shows a view of the closure along the closure axis from below, FIG. 4 shows a view of the closure along the closure axis from above, FIGS. 5a-c show a closure in various stages with closed and opened membrane and with an introduced discharge spigot, and FIG. 6 shows a cross-section through the upside-down container with an applied closure together with a discharge spigot which has been introduced through the closure.

DETAILED DESCRIPTION

FIG. 1 shows a closure part according to the invention, in this case as a perspective view inclinedly from below illustrating a complete closure 100, that is to say viewed from the closure opening into the interior of the closure 100. The description hereinafter relates at the same time to FIGS. 1 to 4.

It is possible to see in particular from FIGS. 3 and 4 and also in the sectional view in FIG. 2 a head plate which is in the form of a circular ring and to the outer edge of which is attached an approximately cylindrical cap skirt 2 extending axially downwardly. At the inner edge of the head plate 1 an initially downwardly conically tapering portion of the discharge portion 3 extends axially downwards, followed by a cylindrical portion, at the end of which it is in turn possible to see a membrane 7 which closes the cross-section of the discharge portion 3.

The membrane 7 is connected along the greatest part of its periphery by way of a material portion 8 which is weakened by an incision and which is referred to here as the "tear line", being connected to a thin annular edge of the membrane 7 outside the tear line 8 or directly to the lower end of the discharge portion 3. The incision thus extends along a circular line of a maximum diameter within the cross-section of the discharge portion 3.

The tear line 8 is only interrupted by a very short hinge portion 9 which constitutes about 10° in the peripheral direction and which holds the membrane firmly to the discharge portion. In addition it is possible to see at the inside of the head plate 1 a peripherally extending sealing projection portion 11 between the discharge portion 3 and the cap skirt 2, and a further annularly peripherally extending seal 12 between the sealing projection portion 11 and the cap skirt 2. The cap skirt 2 also has a female thread 13 and is connected by way of its lower edge to a folded-over tamper-evident band 14, a so-called flexband.

FIG. 4 shows a view from above on to the plastic closure 100, in which it is also possible to see the head plate 1, the cap skirt 2, the discharge portion 3 and the membrane 7. The section in FIG. 2 indicated by the enlarged part 2A corresponds to the section line A-A in FIG. 4.

FIG. 5 shows a perspective view from the interior of the plastic closure 100 in three different stages, more specifically in FIG. 5A in an intact unused state, in FIG. 5B with a partially severed and pivoted-out membrane 7 and in FIG. 5C with a discharge spigot 20 which has been passed through the discharge portion 3 with the membrane completely pivoted out.

FIG. 6 shows a cross-section containing the axis in the state shown in FIG. 5C.

The embodiment illustrated in the Figures of a closure for large containers has a thread 13 which is screwed on to a corresponding thread of a large container. The neck of such a large container has a radially outwardly facing securing ring (only indicated in FIG. 6), behind which a flexband 14 engages. The flexband 14 is an upwardly turned axial prolongation of the cap skirt 2. End projections on the flexband 14 bear against the securing ring 24 of the container neck and thus prevent the closure 100 from being unscrewed from the container neck, wherein, in the case of it being forcibly turned, the entire flexband also tears away, being connected to the lower edge of the cap skirt by easily frangible bridges.

As can be seen from FIG. 6 the upper edge or the upper portion of the container neck (which is downward in FIG. 6) is received in an annularly peripherally extending cavity which is enclosed in a U-shape by the cap skirt 2, an outer portion of the annular head plate 1 and the sealing projection portion 11 which is in the form of a short hollow-cylindrical portion with an outwardly projecting bead 16. A further annularly peripherally extending lip seal 12 extends between the sealing projection portion 11 and the cap skirt 2 downwardly from the head plate 1 and is connected to the top side of the edge of the bottle neck while the bead 16 bears sealingly against the inside surface of the container neck.

To connect the closure or a large container 30 closed with the closure 100 to the outside of the container a discharge spigot 20 is introduced from the exterior, that is to say from the side of the head plate 1, into the discharge portion 3 (see FIG. 6). By virtue of a suitable pressure applied by the discharge portion to the membrane 7 the latter tears away from the lower edge of the discharge portion 3 along the tear line 8 and only still remains suspended from the discharge portion along a short hinge portion 9. In that way the membrane can be pivoted axially downwardly and laterally out of the cross-section of the discharge portion into the position shown in FIG. 5B. That is effected by introducing the discharge spigot 20 which in the position shown in FIGS. 5C and 6 has pushed the membrane 7 aside and sealingly bears with its outside surface against the lower inside wall of the discharge portion 3 and possibly an annular edge of the membrane 7 outside the cut line 8.

As can be seen by reference to FIG. 6 the liquid (drinking water) in the container 30 can flow away through the discharge spigot 20 through openings at the inner end thereof, in which respect it is possible to provide a valve in a further configuration (not shown) of the discharge spigot outside the container 30 and the closure 100 in order to meter the discharge flow of liquid from the container 30 in the desired fashion.

The invention claimed is:

1. A plastic closure part which can be fixed to a container or a further closure part to be fixed to the container, comprising:
   a tubular discharge portion whose cross-section is closed by a membrane which has a tear line extending peripherally over more than 180° along its outer edge, characterised in that the tear line is formed by a cut introduced into the material of the membrane with a cutting or punching tool, and wherein the cut is introduced after injection moulding of the plastic closure.

2. A plastic closure part according to claim 1 characterised in that the tear line of the membrane is cut in a region in which the wall thickness of the membrane is at least 0.5 mm.

3. A plastic closure part according to claim 2 characterised in that the wall thickness of the membrane is reduced by the tear line to a maximum thickness of 0.1 mm.

4. A plastic closure part according to claim 2 characterised in that the wall thickness of the membrane is reduced by the tear line to a thickness between 0.06 and 0.1 mm.

5. A plastic closure part according to claim 1 characterised in that the wall thickness of the membrane is reduced by the tear line to a thickness of less than 0.15 mm.

6. A plastic closure part according to claim 1 characterised in that the tear line extends along the periphery of the membrane over more than 270° and less than 360°.

7. A plastic closure part according to claim 6 characterised in that the tear line extends along the periphery of the membrane over more than 330° and less than 355°.

8. A plastic closure part according to claim 1 characterised in that the radial spacing of the tear line from an inside wall of the tubular discharge portion in its region adjoining the membrane is between 0.0 and 1.0 mm.

9. A plastic closure part according to claim 1 characterised in that the membrane is arranged at a lower end of the tubular discharge portion.

10. A plastic closure part according claim 1 characterised in that an incision of the tear line is introduced from the inside of the closure part.

11. A plastic closure part according to claim 1 characterised in that a portion of the tubular discharge portion, that immediately adjoins the membrane, is cylindrical.

12. A plastic closure part according to claim 1 further characterised as having a closure foot which extends in a ring shape around the tubular discharge portion and which is of U-shaped cross-section and which is adapted to receive an annular end of a bottle neck.

13. A plastic closure part according to claim 12 characterised in that the closure foot has a sealing projection portion with a radially outwardly projecting, peripherally extending sealing bead.

14. A plastic closure part according to claim 1 further characterised as having a cap skirt having a female thread or a radially inwardly projecting bead for snap-on fitment on to a container neck.

15. A plastic closure part according to claim 14 characterised in that adjoining the lower edge of the cap skirt is a tamper-evident band connected to a lower cap edge by frangible bridges.

16. A plastic closure part according to claim 14 characterised in that the cap skirt has a nominal diameter of 50 mm.

17. A method of producing a plastic closure part which can be fixed to a container or a further closure part to be fixed to the container, the method comprising:
   injection moulding the plastic closure part in an injection moulding mould, the plastic closure part having a tubular discharge portion whose cross-section is closed by a membrane; and
   forming an incision that extends peripherally over more than 180° along an outer edge of the membrane, wherein the incision defines a tear line for the membrane, is formed after the injection moulding operation and at least partial hardening of the plastic closure part, and is formed by a cutting or punching tool.

18. A method according to claim 17 characterised in that the incision is introduced while the plastic closure part is still in the partially opened injection moulding mould prior to definitive ejection.

19. A method according to claim 17 characterised in that filling of cavities of the injection moulding mould is respectively effected by way of a sprue disposed in the region of the membrane.

20. A method according to claim 19 characterised in that the sprue is disposed in the centre of the membrane.

* * * * *